United States Patent
Hamada

(10) Patent No.: US 8,406,600 B2
(45) Date of Patent: Mar. 26, 2013

(54) IMAGING APPARATUS

(75) Inventor: Jun Hamada, Osaka (JP)

(73) Assignee: Panasonic Corporation, Osaka (JP)

( * ) Notice: Subject to any disclaimer, the term of this patent is extended or adjusted under 35 U.S.C. 154(b) by 170 days.

(21) Appl. No.: 12/877,336

(22) Filed: Sep. 8, 2010

(65) Prior Publication Data

US 2011/0058787 A1 Mar. 10, 2011

(30) Foreign Application Priority Data

Sep. 9, 2009 (JP) ................................ 2009-207700

(51) Int. Cl.
*H04N 5/77* (2006.01)
(52) U.S. Cl. ........ 386/224; 386/226; 386/227; 386/228; 382/115; 382/118; 726/4; 726/27; 726/28
(58) Field of Classification Search .................. 386/224, 386/227, 228; 382/118, 115; 726/4, 27–28
See application file for complete search history.

(56) References Cited

U.S. PATENT DOCUMENTS

| 7,650,057 | B2 * | 1/2010 | Takeshita | 386/248 |
| 8,063,947 | B2 * | 11/2011 | Yokohata | 348/222.1 |
| 2008/0069407 | A1 * | 3/2008 | Kocher | 382/115 |
| 2008/0152146 | A1 * | 6/2008 | Conrado et al. | 380/278 |
| 2009/0112872 | A1 * | 4/2009 | Doi | 707/9 |
| 2009/0153676 | A1 * | 6/2009 | Nakase et al. | 348/207.99 |
| 2010/0235922 | A1 * | 9/2010 | Tsusaka et al. | 726/26 |
| 2011/0078097 | A1 * | 3/2011 | Thornton et al. | 706/12 |
| 2011/0273474 | A1 * | 11/2011 | Iwayama | 345/636 |
| 2011/0321137 | A1 * | 12/2011 | Iida et al. | 726/4 |
| 2012/0002849 | A1 * | 1/2012 | Tokuse | 382/118 |

FOREIGN PATENT DOCUMENTS

JP 2009-110147 5/2009

* cited by examiner

*Primary Examiner* — Helen Shibru
(74) *Attorney, Agent, or Firm* — Wenderoth, Lind & Ponack, L.L.P.

(57) ABSTRACT

A imaging apparatus includes a storage unit that stores registration information in which information relevant to a feature of an object, of a subject, to be recognized, personal information relevant to attribute of the subject, and non-personal information which is different from the personal information are related with each other and registered. A video generator captures a subject image to generate video data, and a detector detects an object having the same feature as that registered in the registration information. An embedding unit embeds non-personal information relating to the object to be recognized into the video data to be generated, and a management file generator generates a management file. The management file includes the non-personal information to be embedded into the video data and the personal information related to the non-personal information to be embedded into the registration information.

6 Claims, 16 Drawing Sheets

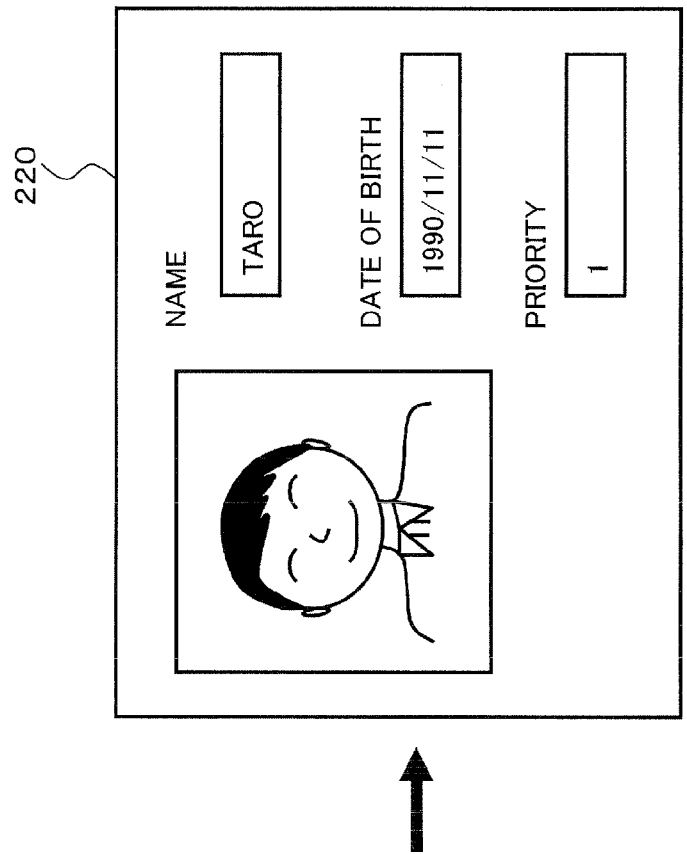
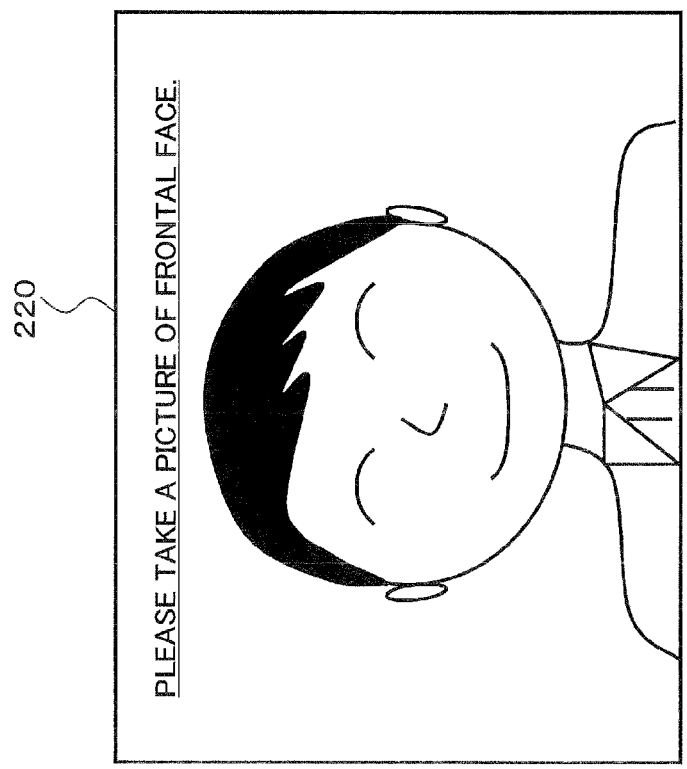
Fig. 4A
Fig. 4B

Fig. 5

FACE REGISTRATION INFORMATION

| FEATURE AMOUNT | NAME | DATE OF BIRTH | PRIORITY |
|---|---|---|---|
| FEATURE AMOUNT DATA A | TARO | 1985.01.01 | 1 |
| FEATURE AMOUNT DATA B | HANAKO | 1990.02.02 | 2 |
| FEATURE AMOUNT DATA C | SAKURA | 1995.03.03 | 3 |
| ... | ... | ... | ... |

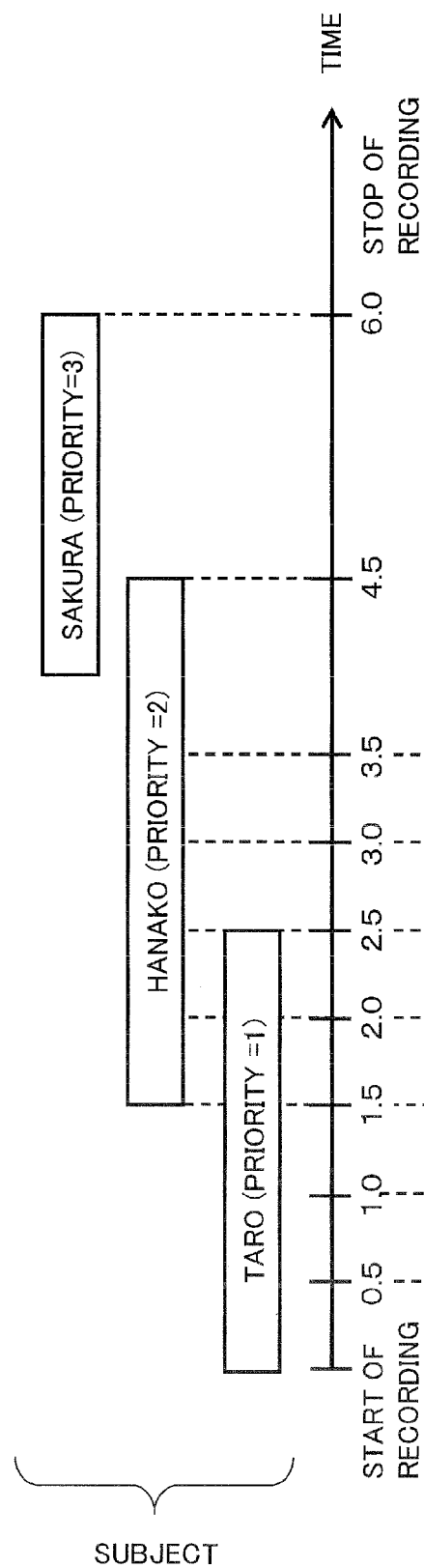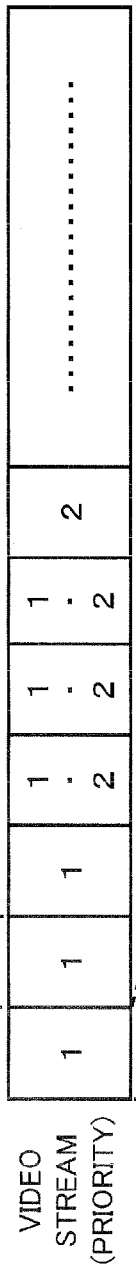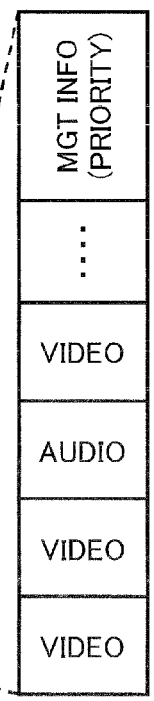

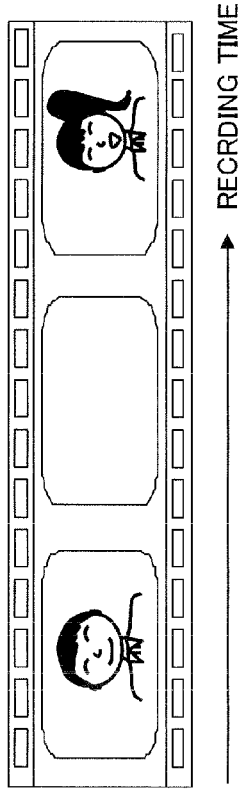

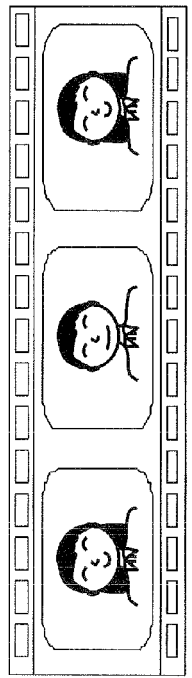
Fig. 11A  FACE REGISTRATION INFO. AT START OF RECORDING VIDEO DATA 2
NAME:     SAKURA  HANAKO  TARO
PRIORITY:   1        2       3
Fig. 11B  RECORDED VIDEO
→ RECORDING TIME
Fig. 11C  VIDEO DATA 2
| PRIORITY (2) | ... | PRIORITY (3) | PRIORITY (2) |
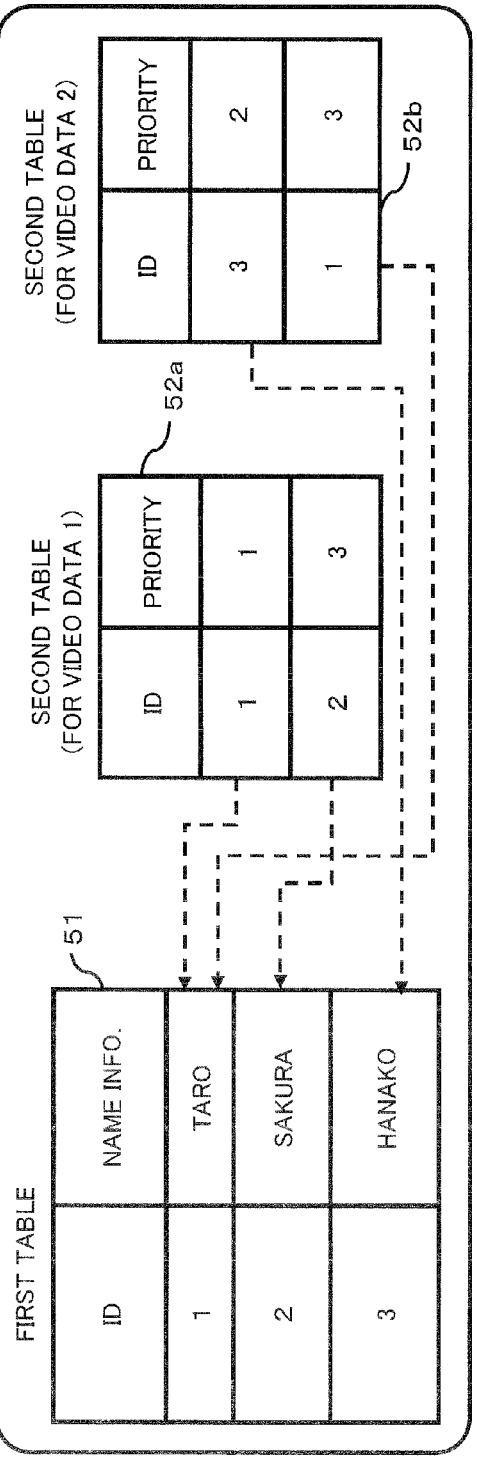
Fig. 11D  MANAGEMENT FILE
FIRST TABLE
| ID | NAME INFO. |
|----|------------|
| 1  | TARO       |
| 2  | SAKURA     |
| 3  | HANAKO     |
SECOND TABLE (FOR VIDEO DATA 1)
| ID | PRIORITY |
|----|----------|
| 1  | 1        |
| 2  | 3        |
SECOND TABLE (FOR VIDEO DATA 2)
| ID | PRIORITY |
|----|----------|
| 3  | 2        |
| 1  | 3        |

IMAGING APPARATUS

BACKGROUND

1. Technical Field

The technical fields relates to an imaging apparatus, and particularly to the imaging apparatus having a face recognition function.

2. Related Art

JP2009-110147A discloses an image processing apparatus that can recognize a person's face. This image processing apparatus relates an image of a person's face to be recognized, information about person's name and information about person's date of birth with each other, and store them. When detecting a facial image of a person to be recognized in an imaged data at the time of taking a picture, the image processing apparatus relates information about person's name and information about person's date of birth with the imaged data to record them.

As a result, at the time of reproducing the imaged data, the image processing apparatus can display the information about person's name and the information about person's date of birth included in the imaged data on a liquid crystal device (LCD) monitor.

In recent years, image data recorded personally is open uploaded to a predetermined website via a network to be opened to the public. When image data including personal information such as name information and date of birth, as the image data generated by the image processing apparatus in JP2009-110147A, is uploaded and is open to the public, a problem occurs in that privacy is not sufficiently protected.

SUMMARY

To solve the above problem, a imaging apparatus with a facial recognition function is provided that can protect privacy.

In one aspect, an imaging apparatus is provided, which includes: a storage unit configured to store registration information in which information relevant to a feature of an object, of a subject, to be recognized, personal information relevant to attribute of the subject, and non-personal information which is different from personal information are related with each other and registered; a video generator configured to capture a subject image to generate video data; a detector configured to detect an object to be recognized which has the same feature as that registered in the registration information, in an image represented by the video data generated by the video generator; an embedding unit configured to embed the non-personal information relating to the object to be recognized which is detected by the detector into the video data to be generated; and a management file generator configured to generate a management file, the management file storing the non-personal information to be embedded into the video data and the personal information related to the non-personal information to be embedded into the registration information.

According to the above aspect, an imaging apparatus having a face recognition function, which can protect privacy can be provided.

BRIEF DESCRIPTION OF DRAWINGS

FIGS. 4A and 4B are diagrams describing screens to be used for registering the face to be recognized.

FIG. 5 is a diagram describing a data structure of facial registration information.

FIGS. 8A to 8C are diagrams describing a state that priority is embedded into the video data (video stream).

FIGS. 10A to 10D are diagrams describing first and second tables in the management file.

FIGS. 11A to 11D are diagrams describing first and second tables in the management file.

DETAILED DESCRIPTION

Embodiments are described below with reference to the accompanying drawings.

First Embodiment 1-1. Overview

A digital video camera 100 according to a present embodiment can record a moving image, and has a function for recognizing a subject's face. The digital video camera 100 can register the subject's face to be recognized, and can recognize the face which is registered preliminarily.

1-2. Configuration

Figure 1:
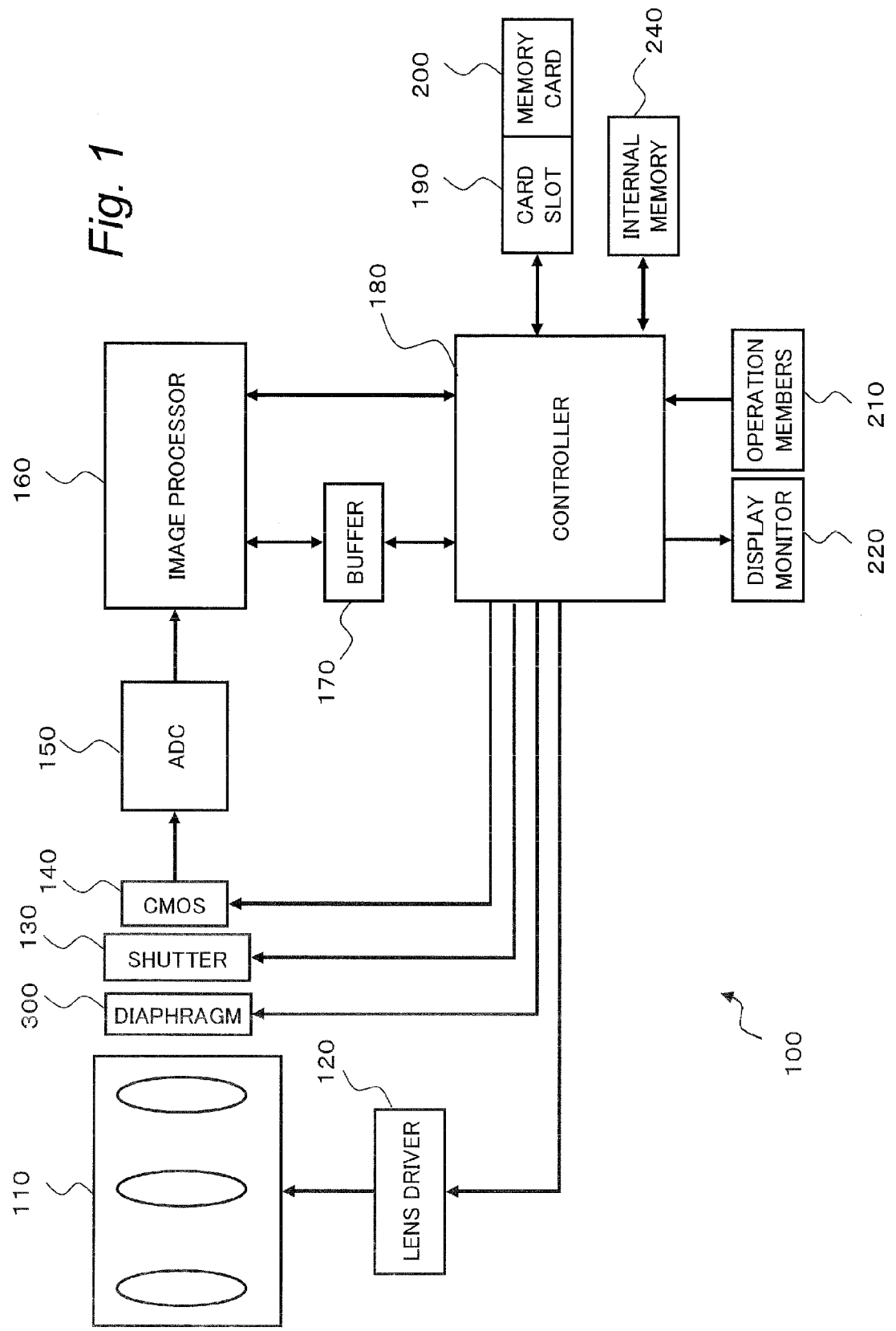
FIG. 1 is a block diagram illustrating a configuration of a digital video camera 100.

An electrical configuration of the digital video camera 100 according to the present embodiment is described with reference to FIG. 1. FIG. 1 is a block diagram illustrating a configuration of the digital video camera 100. The digital video camera 100 captures a subject image formed by an optical system 110 composed of one or a plurality of lenses, with a CMOS image sensor 140. Video data generated by the CMOS image sensor 140 is subject to various processes in an image processor 160, and is stored in a memory card 200. The configuration of the digital video camera 100 is described in detail below.

The optical system 110 is composed of a zoom lens and a focus lens. The zoom lens is moved along an optical axis, so that a subject image can be enlarged or reduced. Further, the focus lens is moved along the optical axis so that a focus of a subject image can be adjusted.

A lens driver 120 drives various lenses included in the optical system 110. For example, the lens driver 120 includes a zoom motor for driving the zoom lens and a focus motor for driving the focus lens.

A diaphragm 300 adjusts an aperture automatically or according to user's settings, to regulate a quantity of transmitting light.

A shutter 130 is a unit for shielding light to be transmitted through the CMOS image sensor 140. The CMOS image sensor 140 captures a subject image formed by the optical system 110 to generate video data. The CMOS image sensor 140 performs various operations such as exposure, transfer and electronic shutter.

An A/D converter 150 converts analog video data generated by the CMOS image sensor 140 into digital video data.

An image processor 160 applies various image processes to the video data generated by the CMOS image sensor 140. By applying the various image processes to video data generated by the image sensor 140, the image processor 160 generates video data to be displayed on a display monitor 220 or generates video data to be stored in the memory card 200. For example, the image processor 160 executes image processes such as gamma correction, white balance correction and damage correction on the video data generated by the CMOS image sensor 140. Further, the image processor 160 compresses the video data generated by the CMOS image sensor 140 according to a compressing format conforming to the MPEG standards. The image processor 160 can be realized by a DSP (Digital Signal Processor), a microcomputer or the like.

A controller 180 is a control unit for controlling an entire operation of the digital video camera 100. The controller 180 has a function for detecting a facial image included in a video represented by the video data generated by the image processor 160. This function is described concretely. An internal memory 240 stores information about positions of eyes, a nose, a mouth, and so on in a face of a standard person or the like. The controller 180 determines whether an area of a video represented by the video data generated by the image processor 160 includes a portion having a positional relationship similar to the positional relationship among eyes, a nose and a mouth stored in the internal memory 240. When the determination is made that it includes the portion having the similar positional relationship, the controller 180 detects, as a face, a predetermined range around the portion.

Further, the controller 180 has a function for determining (recognizing) whether a face of the subject represented by the video data generated by the image processor 160 is identical to the face registered preliminarily in the internal memory 240. Specifically, the controller 180 detects the face in the video represented by the video data generated by the image processor 160. At the time of detecting the face, the controller 180 extracts feature amount information representing facial features from the positional relationship amount eyes, nose and mouth of the face, a color of the face, an outline of the face and eyebrows. When the facial feature amount information is extracted, the controller 180 determines whether the extracted feature amount information is similar to the facial feature amount information registered preliminarily in the internal memory 240. When the determination is made that they are similar, the controller 180 recognizes that the detected face is identical to the face registered preliminarily in the internal memory 240. On the other hand, when the determination is made that they are not similar, the controller 180 recognizes that the detected face is different from a face that is not registered preliminarily in the internal memory 240.

The controller 180 can be realized by a semiconductor device or the like. The controller 180 may be composed of only hardware, or of a combination of hardware and software. The controller 180 can be realized by a microcomputer or the like.

A buffer 170 functions as a work memory of the image processor 160 and the controller 180. The buffer 170 can be realized by DRAM, a ferroelectric memory or the like.

The memory card 200 can be attached to a card slot 190. The card slot 190 can be mechanically or electrically connected to the memory card 200. The memory card 200 contains a flash memory or a ferroelectric memory, and can store data such as video data generated by the image processor 160.

The internal memory 240 may be composed of a flash memory, a ferroelectric memory or the like. The internal memory 240 stores a control program for controlling the entire operation of the digital video camera 100, information about a standard positional relationship among eyes, a nose and a mouth to be used for detecting a face, and information about a face registered preliminarily for recognizing a face.

An operation member 210 is a generic name of a user interface for receiving user's operations. For example, it corresponds to, a cross key, a determination button, a mode dial, a recording start button and the like for receiving user's operations.

The display monitor 220 can display a video represented by the video data generated by the CMOS image sensor 140 (through video) and a video represented by video data read from the memory card 200. Further, the display monitor 220 can display also various menu screens for performing various settings of the digital video camera 100.

1-3. Facial Recognition Function

As described above, the digital video camera 100 has the facial recognition function. The facial recognition function is for determining whether a face registered preliminarily is identical to a face of a subject captured by the CMOS image sensor 140.

The digital video camera 100 determines whether a feature amount of a registered face is similar to a feature amount of a face included in a captured video. When the determination is made that they are similar, the digital video camera 100 determines that the registered face is identical to the captured face.

The digital video camera 100 determines whether the registered face is present in a captured subject during the operation for capturing the subject. When the determination is made that the registered face is present, the digital video camera 100 performs, for example, an operation for preferentially focusing the registered face. Further, when the determination is made that the registered face is present during capturing of an image, the digital video camera 100 can display a name registered preliminarily around a facial frame surrounding the recognized face.

Figure 2:
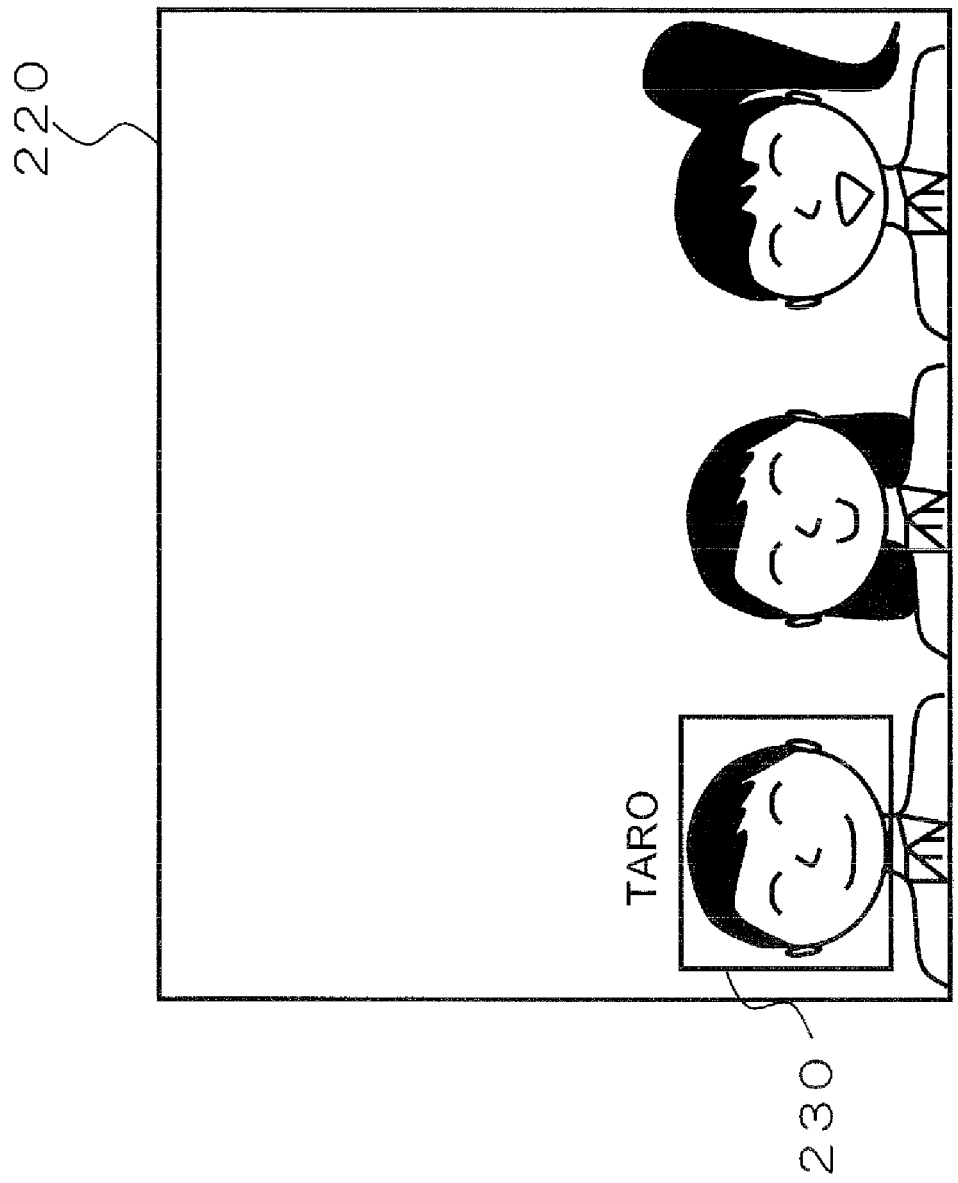
FIG. 2 is a diagram describing a facial recognition function.

When an image including three subjects is captured as shown in FIG. 2, for example, a boy on the leftmost side is registered preliminarily as an object to be recognized (referred to as "a recognition object"). "Taro" is registered preliminarily as the name of the boy. In this case, a facial frame 230 is displayed around the boy's face, as a recognition object, on the display monitor 220, and the name "Taro" is displayed around the facial frame 230. It is noted that the digital video camera 100 can recognize a predetermined number of people (for example, ten people) at the same time. However the digital video camera 100 can display names for only three people with higher maximum priority at the same time. This is because if all names of the recognized people are displayed, many names are displayed on the display monitor 220, and it causes difficulty for the user to view the names.

When an autofocus mode is set, the digital video camera 100 focuses on the boy's face as the recognition object.

By registering preliminarily the face and the name of the subject in this manner, the user can confirm the name information or the like about the subject during the imaging of the subject and simultaneously can focus on the subject preferentially.

1-4. Operation 1-4-1. Registration of Object to be Recognized

Figure 3:
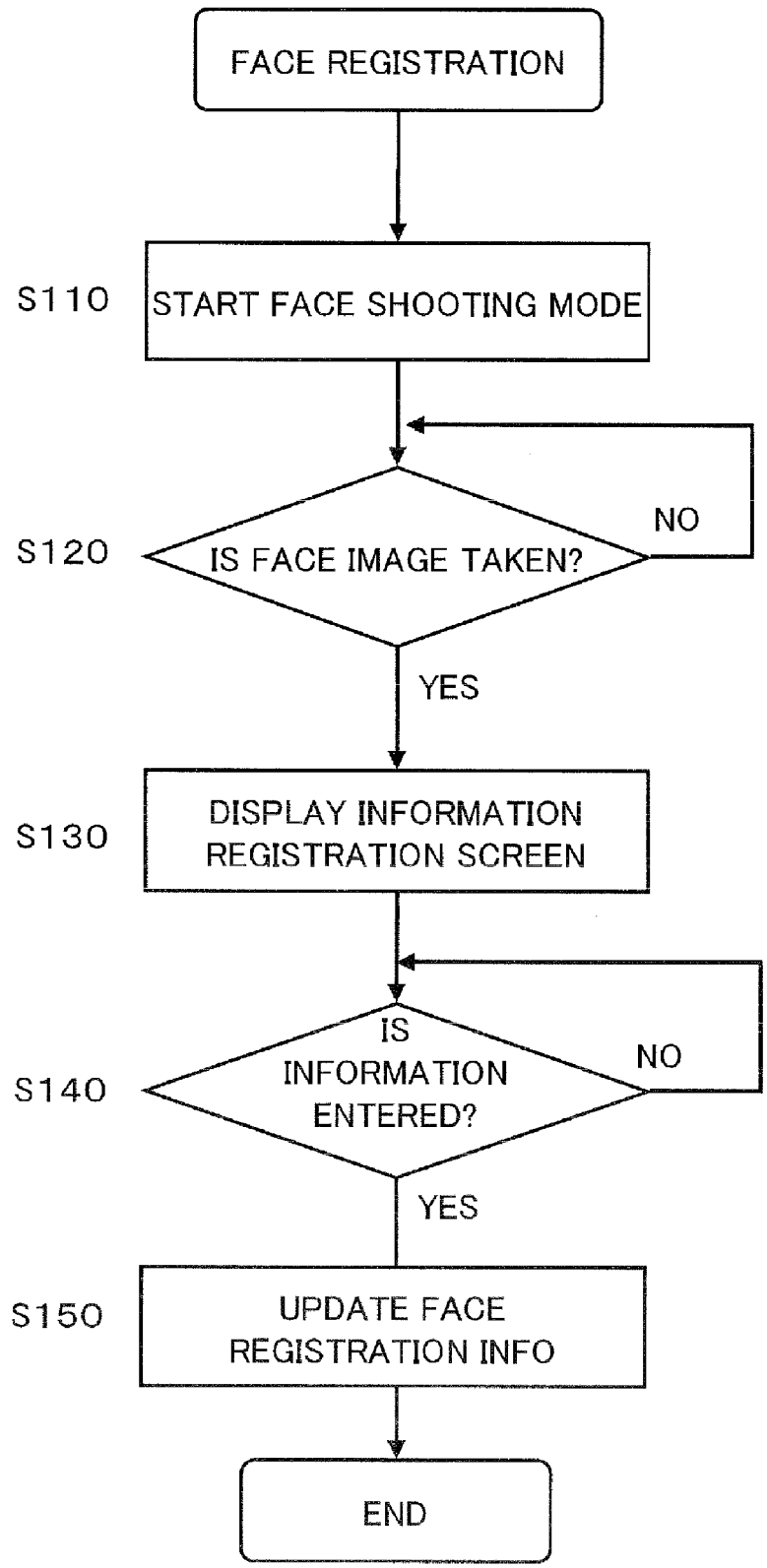
FIG. 3 is a flowchart describing an operation for registering a face to be recognized.

A method for registering preliminarily a face to be recognized is described with reference to FIGS. 3 to 5. FIG. 3 is a flowchart describing a method for registering preliminarily a face to be recognized. FIGS. 4A and 4B are diagrams describing the method for registering preliminarily a face to be recognized. FIG. 5 is a diagram describing a structure of facial registration information.

The user can set the digital video camera 100 to a mode for registering a face to be recognized (face registration mode) by operating the operation member 210. In FIG. 3, when the digital video camera 100 is set to the face registration mode, the controller 180 switches the mode to a mode for shooting a face to be registered (face shooting mode) (S110). When the face shooting mode is started, for example, a video shown in FIG. 4A is displayed on the display monitor 220.

When the face shooting mode is started, the controller 180 stands by until a still image of the face to be recognized is shot by the user (S120).

When the still image of the face to be recognized is shot by the user, the display monitor 220 displays an information registration screen for prompting the user to enter various information about the recognition object which is to be registered (S130). For example, the display monitor 220 displays the information registration screen for prompting the user to input personal information such as the name and the date of birth of the recognition object and information other than the personal information such as priority information as shown in FIG. 4B. The priority information is a parameter representing a preferential processing order. For example, the priority information is a parameter to be use for determining a face to be preferentially processed (for example, focus) when a plurality of registered faces are detected in a captured image, or used for detecting an image including a specific face to reproduce it at the time of playback of the video.

When the information registration screen is displayed, the controller 180 stands by until various information is entered by the user (S140).

When the various pieces of information are completely entered, the controller 180 extracts the feature amount information about the face from the captured image. The controller 180 relates the entered various pieces of information with the extracted feature amount information about the face and records them as the facial registration information into the internal memory 240 (S150). When the recording of the facial registration information to the internal memory 240 is completed, the face registration mode is ended. FIG. 5 illustrates an example of structure of the facial registration information. In the example of FIG. 5, name, date of birth and priority information are registered for each recognition object, but other information about the recognition object may be registered as the facial registration information.

With such a method, the user can register the information about a face to be recognized to the digital video camera 100.

The digital video camera 100 relates the information about the face to be recognized with the name, the date of birth and priority information is stored. However, information to be registered is not limited to such information. For example, besides the name and the date of birth, personal information such as blood type and address may be related to the information about the face to be recognized, and stored. Further, besides the priority information, information other than the personal information such as simple numbers and alphabets having no meaning may be related to the information about the face to be recognized, and stored. Specifically, besides the priority information, non-personal information irrelevant to attribute of the person may be related to the information about the face to be recognized, and stored.

1-4-2. Management File

Figure 6:
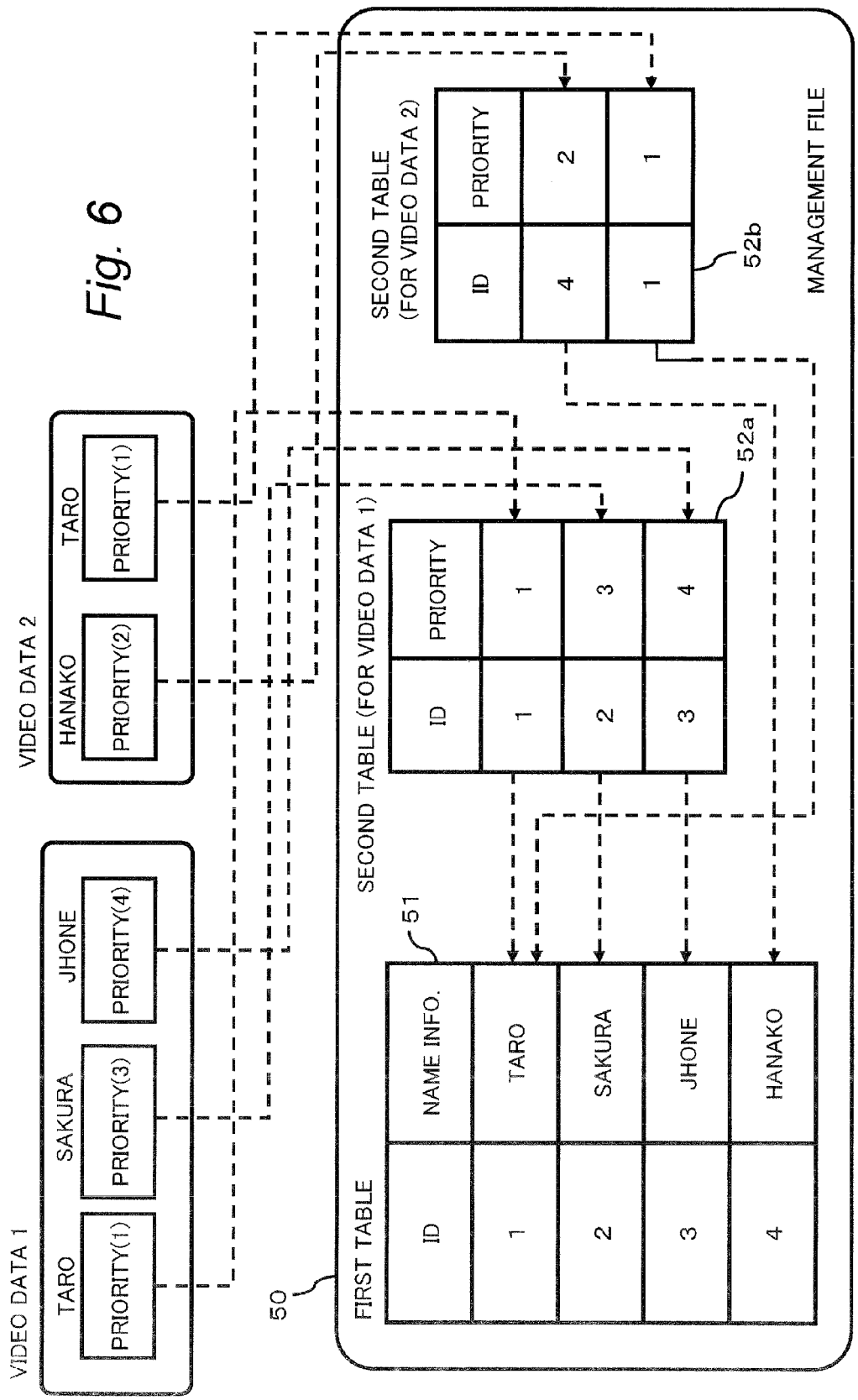
FIG. 6 is a diagram illustrating a relationship between video data and a management file.

A management file, that is generated in association with video data when a video is recorded by the digital video camera 100, is described. FIG. 6 is a diagram describing video data and a management file generated by the digital video camera 100.

A management file 50 is a file that is generated in association with video data recorded by the digital video camera 100 and is recorded in a memory card 200. The management file 50 has two types of tables including a first table 51 and a second table 52a or 52b. The first table 51 is provided in association with entirety of all pieces of video data recorded by the digital video camera 100. When each video data includes a face identical to the face registered in the facial registration information, name information about the included face is related with an ID, and is managed in the first table 51. The ID is identification information that is uniquely determined in the first table 51. The second table 52a or 52b is provided for each video data recorded by the digital video camera 100. When the corresponding video data includes a face identical to the registered face, the priority of the included face and the ID are related to each other and are managed in the second table 52a or 52b. In such a manner, the first table 51 and the second table 52a or 52b are related with each other through the ID.

For example as shown in FIG. 6, when video data 1 and video data 2 are recorded by the digital video camera 100, if the registered face is detected in the video data 1 and the video data 2, the name information about the face is related with the ID and is registered in the first table 51. The second table 52a is provided for the video data 1. When the registered face is detected in the video data 1, the priority associated with the face is related with ID so as to be registered in the second table 52a. For example, since the video data 1 includes faces of "Taro", "Sakura" and "John", "1" as the priority of "Taro", "3" as the priority of "Sakura" and "4" as the priority of "John" are related with IDs and are registered in the second table 52a. Similarly, the video data 2 includes faces of "Taro" and "Hanako", and "2" and "1" as the priorities of "Hanako" and "Taro" are related with IDs and are registered in the second table 52b associated with the video data 2.

A method for generating and a method for using the management file 50 are described later.

1-4-3. Generation of Video Data

Figure 7:
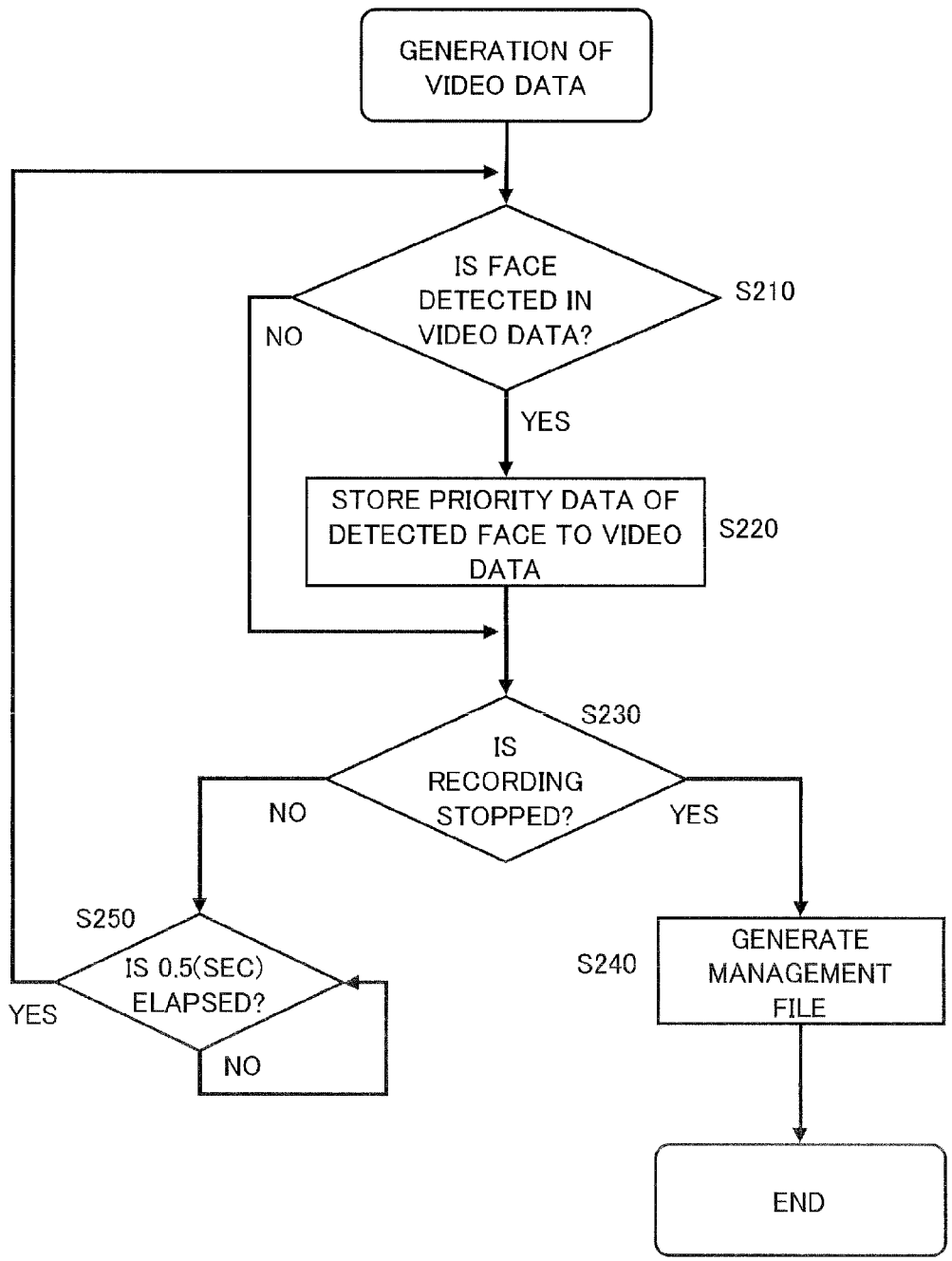
FIG. 7 is a flowchart describing an operation for generating video data performed by the digital video camera (First Embodiment).

The operation for generating video data performed by the digital video camera 100 is described with reference to FIG. 7. FIG. 7 is a flowchart describing the operation for generating video data performed by the digital video camera 100.

The user can set the digital video camera 100 into a recording mode by operating the mode dial of the operation member 210 to. When the digital video camera 100 is set into the recording mode, the user can start recording of video data by pressing down the recording start button of the operation member 210.

When the recording of video data is started, the controller 180 sequentially records generated video data into the memory card 200. At this time, the controller 180 tries to recognize a recognition object (face) registered in the facial registration information in the video data (S210). When the recognition object (face) registered in the facial registration information is recognized (detected) in the video data, the controller 180 embeds information about priority associated with the recognized (detected) face into the video data (S220), and generates video data (video stream). In this case, the controller 180 records the priority information embedded into the video data into the internal memory 240. The priority information may be recorded in a recording medium other than the internal memory 240. When the recognition object (face) registered in the facial registration information is not recognized (detected) in the video data, the controller 180 generates video data without embedding the priority information into the video data.

The controller 180 determines whether stop of the recording is instructed by the user (S230). When the stop of the recording is instructed, the controller 180 stops the generation of the video data, and generates the management file 50 (S240). The process for generating the management file 50 is detailed later.

On the other hand, when the stop of the recording is not instructed, the sequence stands by for predetermined time (in this example, 0.5 sec.) and then returns to step S210, so that the above process is repeated. That is, priorities of recognition objects are recorded in the video data every predetermined time. With the priorities stored in the video data every predetermined time, the priorities can be referred to at the time of reproducing the video data so that a person who actually appear in the video can be specified, and the personal information about the specified person (for example, name) can be displayed. Further, a scene where a desired person appears can be specified with reference to the priorities. The above process is repeated until the stop of the recording is instructed.

FIGS. 8A to 8C are diagrams describing a state in which a priority is embedded in the video data (video stream) generated in the above manner. FIG. 8A is the diagram describing a subject that changed with time and is included in the video. As shown in FIG. 8B, a priority is embedded into the video stream every 0.5 second. The video stream includes video information, sound information and management information as shown in FIG. 8C, and the priority is stored in the management information. In the example of this drawing, the subject to be shot is changed from Taro to Taro and Hanako, to Hanako, to Hanako and Sakura and to Sakura. The priorities of Taro, Hanako and Sakura are "1", "2" and "3", respectively. In this case, the priorities are embedded into the video stream as shown in FIG. 8B.

As described above, when the registered face is detected in a video data during the recording of the video data, the digital video camera 100 embeds the priority information about the detected face into the video data. That is, when the face of the subject image is recognized, only the information other than the personal information is embedded into the video data. As a result, the video data does not include the information that specifies an individual, and thus the personal information can be prevented from being opened even when the video data is uploaded to be opened to the public.

1-4-4. Generation of Management File

Figure 9:
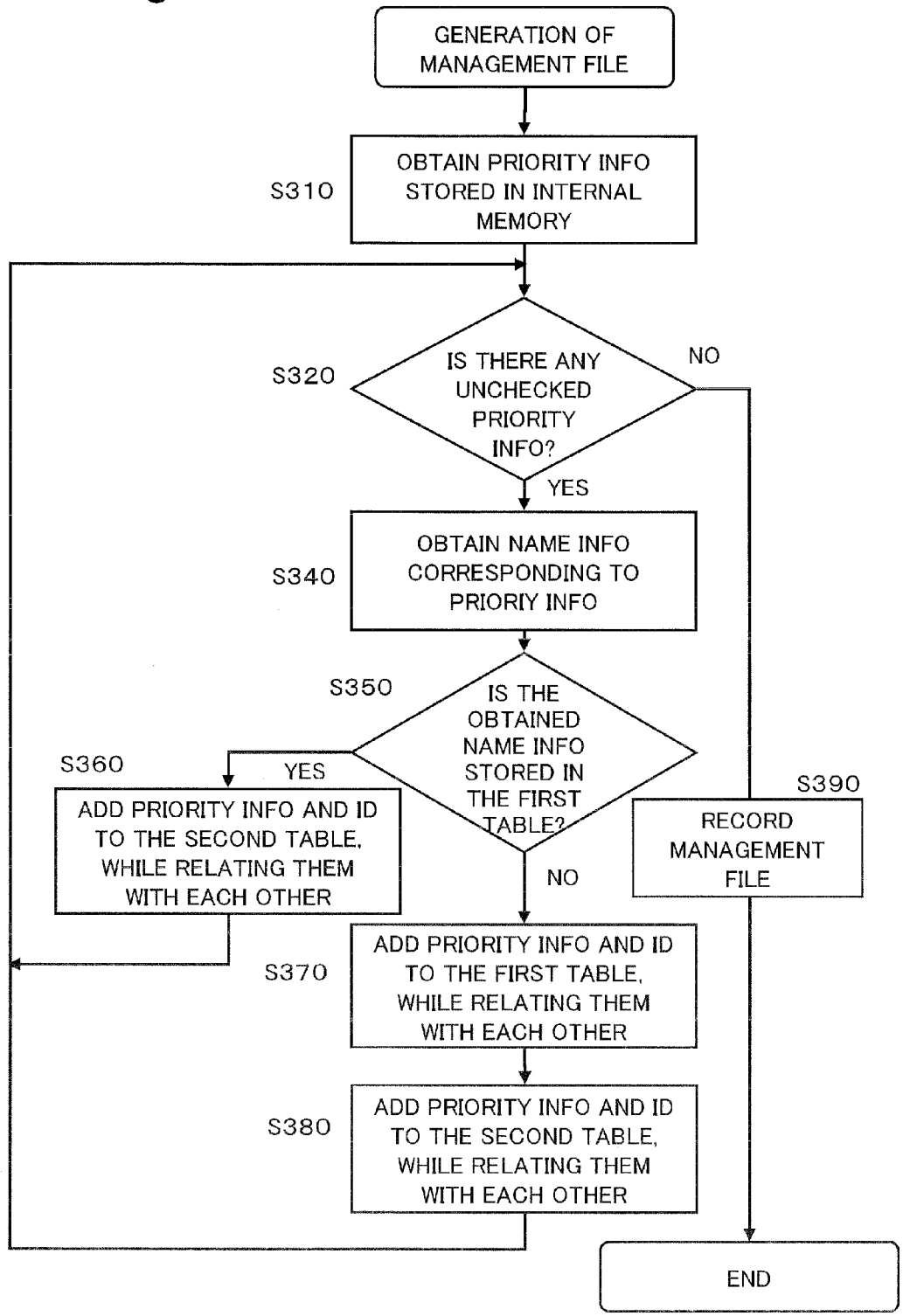
FIG. 9 is a flowchart describing an operation for generating the management file performed by the digital video camera.

An operation for generating the management file 50 performed by the digital video camera 100 is described with reference to FIG. 9. FIG. 9 is a flowchart describing an operation for generating a management file performed by the digital video camera 100.

After the recording of the video data is ended, the controller 180 starts generation of a management file. At first, the controller 180 acquires priority information which is stored during the recording of video data, from the internal memory 240 (S310).

When acquiring the priority information, the controller 180 determines whether there are any priority information that are not yet confirmed in the acquired priority information (S320). That is, the controller 180 confirms all pieces of the acquired priority information.

When the determination is made that no priority information that is not yet confirmed is present (namely, all pieces of the acquired priority information are confirmed), the controller 180 ends the generation of the management file, and records the generated management file in the memory card 200 (S390).

On the other hand, when priority information that is not yet confirmed is present, the controller 180 acquires name information related with the acquired priority information by referring to the facial registration information (S340). The controller 180 determines whether the acquired name information is present in the first table (S350). It is noted that when first video data is generated and first name information is acquired, no data is stored in the first table.

When the determination is made that the acquired name information is present in the first table, the controller 180 acquires an ID related to the acquired name information by referring to the first table, relates the ID with the priority information currently confirmed, and adds the related ID and priority information to the second table (S360). As shown in FIG. 6, the second table is provided for each video data. On the other hand, only one first table is provided for a plurality of video data. Only one first table for storing large data amount of information such as actual name information is prepared, and the second table for storing small data amount of information such as ID and priority information is prepared for each video data. These first and second tables are related with each other via the ID. With such a configuration, a size of the second table can be reduced, and thus an increase in the entire size of the management file can be prevented.

When the determination is made that the acquired name information is not present in the first table, the controller 180 relates the name information with a new ID and adds them to the first table (S370). Further, the controller 180 relates the new ID with the priority information currently confirmed and adds them to the second table (S380).

In this manner, when a recognition object preliminarily registered is detected, the digital video camera 100 embeds ,into the video data, the priority information, as information other than the personal information, among the information stored in association with the detected recognition object. At the same time, the priority information is related to the name information that specifies an individual by the management file (first and second tables). With such a configuration, the user can recognize a person recorded in the video data by referring to the management file and the video data. Further, the video data does not include personal information, and thus the personal information about the subject such as name and date of birth is not handed to others even when the user hands the video data to others.

The generation of the management file is detailed using a concrete example with reference to FIGS. 10 and 11.

A case is described where he facial registration information is in a state shown in FIG. 10A at the time of starting the recording of the video data 1, and "Taro" and "Sakura" appear in this order on a captured video as shown in FIG. 10B. "Taro", "Sakura" and "Hanako" are registered in the facial registration information. When such a video is recorded, as shown in FIG. 10C, the priority "1" of Taro is recorded in the video data 1 at certain timing, and the priority "3" of Sakura is recorded at later timing. The name information about "Taro" and "Sakura" appearing in the captured video are related with IDs and recorded in the first table 51 of the management file 50. Further, the priority "1" of Taro and the priority "3" of "Sakura" are related with the respective IDs and are recorded in the second table 52a.

Subsequently, a case is described below where video data 2 is recorded after the recording of the video data 1. In this case, the facial registration information is changed as shown in FIG. 11A before the recording of the video data 2. In the video data 2, "Hanako", "Taro" and "Hanako" appear in this order (see FIG. 11B). Therefore, as shown in FIG. 11C, in the video data 2, the priority "2" of Hanako is recorded at a certain timing, then the priority "3" of Taro is recorded, and then the priority "2" of Hanako is recorded. As a result, the name information about "Hanako" related to the ID is newly added to the first table 51 of the management file 50. Further, the second table 52b for the video data 2 is added, and the priority "1" of Taro and the priority "3" of Sakura are related to the respective IDs and are recorded in the second table 52b.

1-4-5. Reproduction of Video Data

Figure 12:
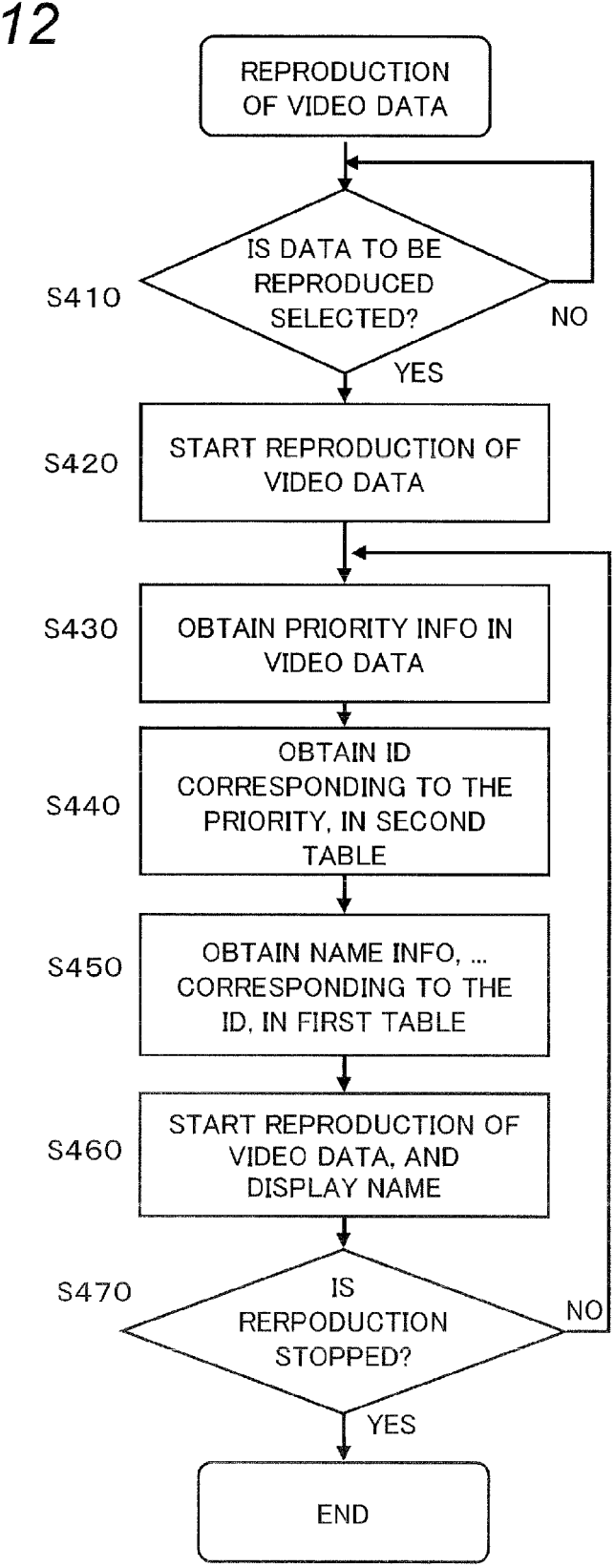
FIG. 12 is a flowchart describing an operation for reproducing the video data performed by the digital video camera (First Embodiment).
Figure 13:
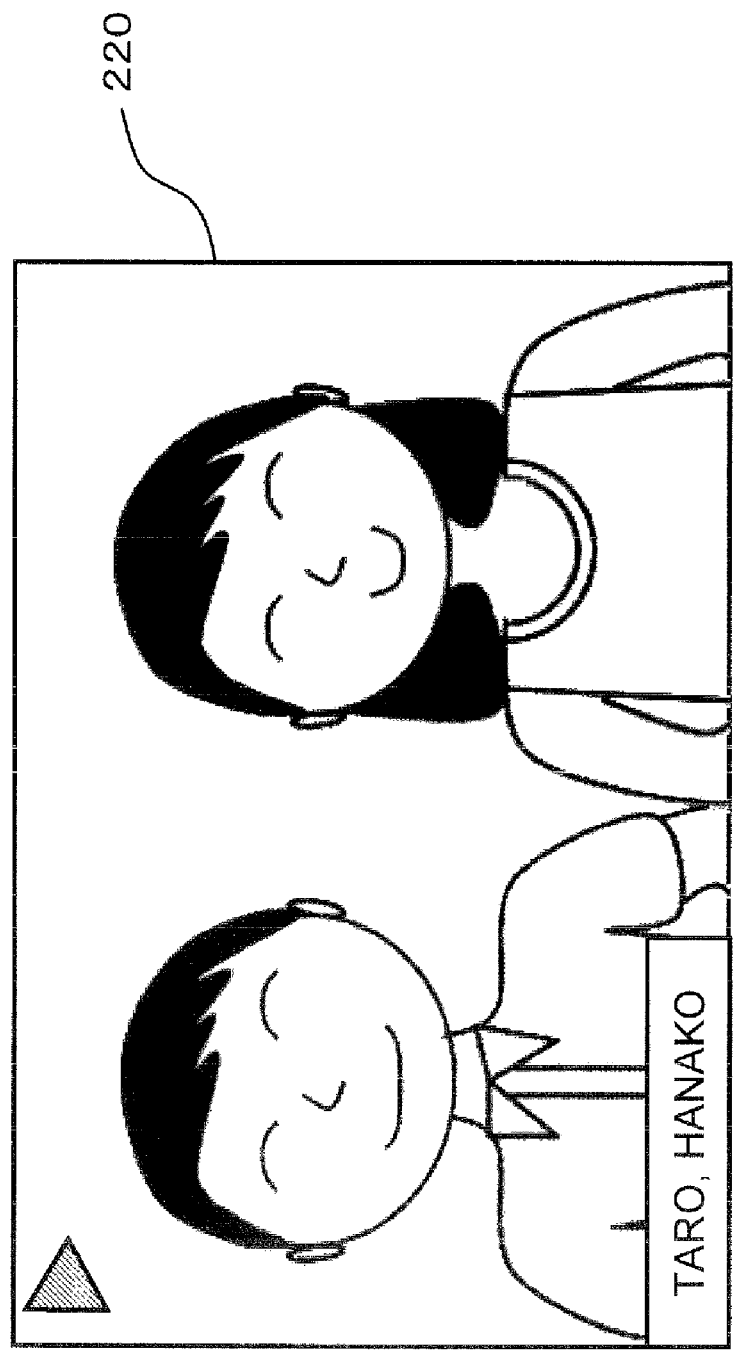
FIG. 13 is a diagram describing a display on a display monitor at the time of reproducing the video data.

An operation for reproducing video data stored in the memory card 200 by the digital video camera 100 is described with reference to FIGS. 12 and 13. FIG. 12 is a flowchart describing the operation for reproducing video data stored in the memory card 200 performed by the digital video camera 100. FIG. 13 is a diagram describing a display state of the display monitor 220 at the time of reproducing the video data.

The user can set the digital video camera 100 into a playback mode by operating the mode dial of the operation member 210. When the digital video camera 100 is set into the reproducing mode (S400), the controller 180 stands by until video data to be reproduced is selected by the user (S410).

When the video data to be reproduced is selected, the controller 180 starts to reproduce the video data (S420), and acquires priority information embedded into the selected video data (S430). Thereafter, the controller 180 refers to the second table that is related to the selected video data in the plurality of second tables included in the management file, and acquires an ID related to the acquired priority information (S440).

The controller 180 refers to the first table in the management file, and acquires name information related to the acquired ID (S450). Thereafter, the controller 180 displays the acquired name information on the display monitor 220 and simultaneously starts to reproduce the selected video data (S460). For example, the digital video camera 100 displays name information about a subject on the display monitor 220 as shown in FIG. 13.

The above operation is repeated until the user instructs the stop of the reproduction (S430 to S470).

In this manner, when reproducing the video data, the digital video camera 100 displays the name information about the subject. As a result, the user can recognize the name of the subject at the time of reproducing the video data.

1-4-6. Upload of Video Data

Figure 14:
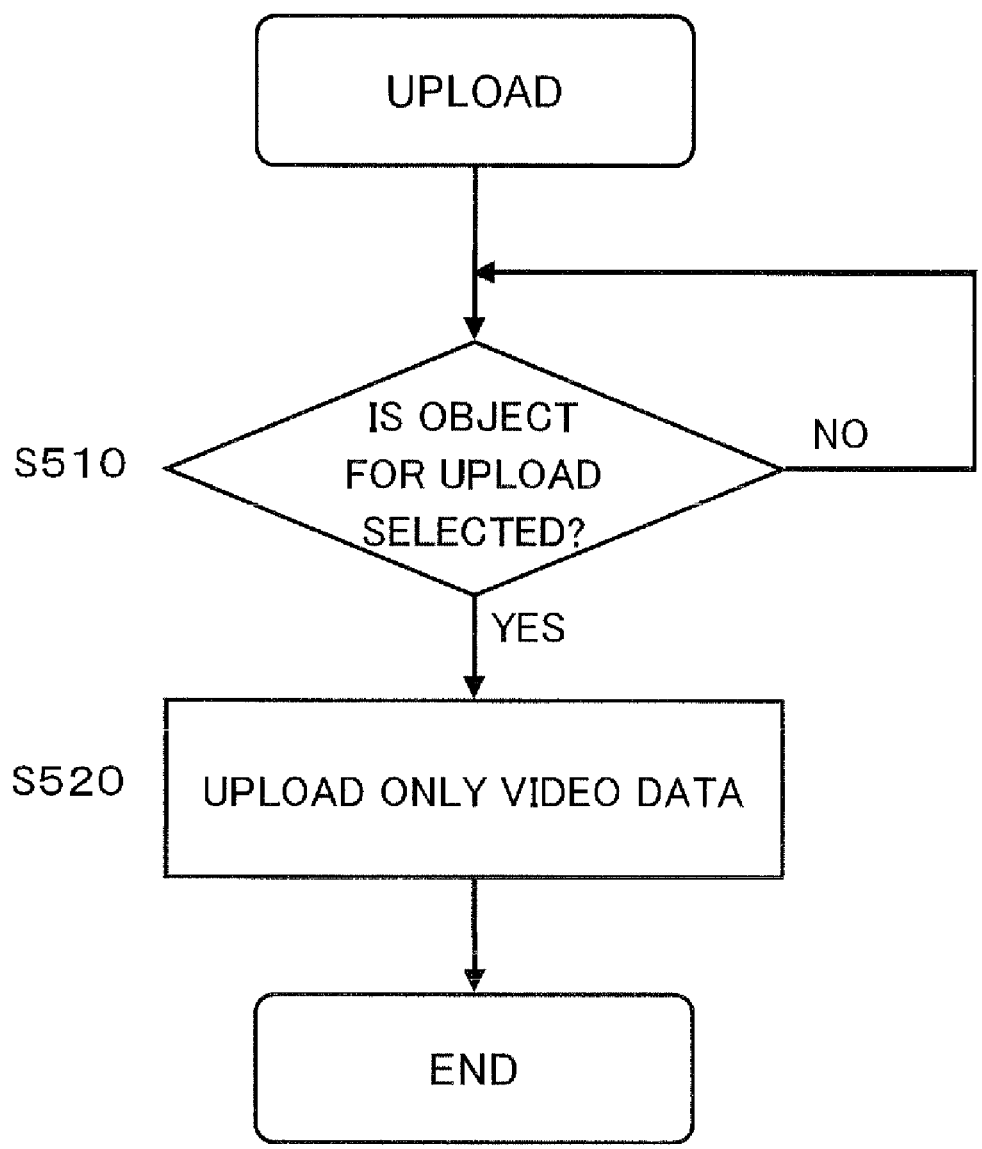
FIG. 14 is a flowchart describing an operation for uploading the video data to the Internet performed by the digital video camera.

An operation for uploading video data stored in the memory card 200 to the Internet performed by the digital video camera 100 is described with reference to FIG. 14. FIG. 14 is a flowchart describing the operation for uploading video data stored in the memory card 200 to the Internet performed by the digital video camera 100.

The user can set the digital video camera 100 into a mode for uploading video data to the Internet by operating the mode dial of the operation member 210. When the digital video camera 100 is set into the mode for uploading video data to the Internet (S500), the controller 180 determines whether to receive selection of video data to be uploaded to the Internet from the user (S510). When the selection of the video data to be uploaded is received from the user, the controller 180 uploads the selected video data to the Internet (S520).

In particular, when the selected video data is uploaded to the Internet, the controller 180 does not upload a management file to the Internet.

In this manner, when uploading the video data to the Internet, the digital video camera 100 uploads only the video data, but does not upload the related management file. With such a configuration, a possibility of leak of personal information due to uploading of the video data can be reduced.

1-5. Conclusion

As described above, the digital video camera 100 according to the embodiment includes: the internal memory 240 for storing facial registration information in which feature amount information about a feature of a face of a subject, name information about attribute (name) of the subject, and priority information which is different from the name information are registered, with the feature amount information, the name information, and the priority information related to each other; the CMOS image sensor 140 and the controller 180 for capturing a subject image to generate video data; the controller 180 for detecting a face which has the same feature as that registered in the facial registration information in an image represented by the video data generated by the CMOS image sensor 140 and the controller 180; the controller 180 for embedding the priority information relating to the face which is detected by the controller 180 into a video data to be generated; and the controller 180 for generating the management file 50 for storing the priority information to be embedded into the video data and the name information related to the priority information to be embedded in the facial registration information.

In this manner, when detecting the face preliminarily registered, the digital video camera 100 embeds the priority information which is unrelated to personal information in the information stored in relation with the detected face, into the video data. With such a configuration, the video data does not include personal information, so that the personal data such as name and date of birth of the subject is not handed to others even when the user hands the video data to others. As a result, the privacy can be protected.

Second Embodiment

Another example of the operation for generating video data is described.

Figure 15:
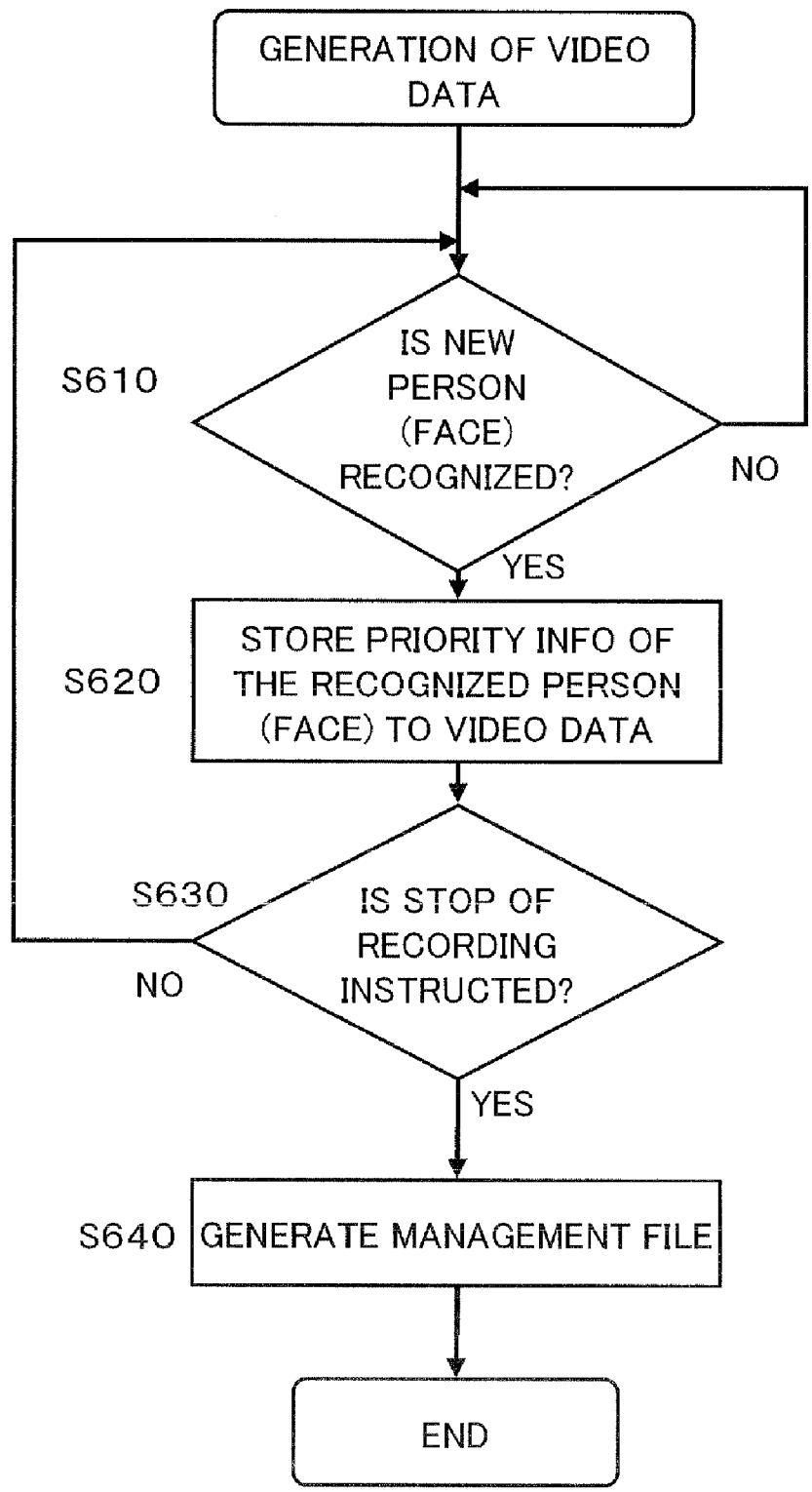
FIG. 15 is a flowchart describing an operation for generating the video data performed by the digital video camera (Second Embodiment).

In the first embodiment, priority information is embedded into video data every predetermined time. On the contrary, in the second embodiment, when an object to be recognized (face) is newly recognized in video data, priority information is embedded into the video data. FIG. 15 is a flowchart illustrating another example of the operation for generating video data performed by the digital video camera 100 according to the second embodiment.

When the recording of video data is started, the controller 180, while sequentially recording generated video data in the memory card 200, determines whether to recognize a new object to be recognized among objects to be recognized stored in the internal memory 240, that has not been recognized yet since the recording of the video data is started (S610). When the determination is made that the new object to be recognized is recognized, the controller 180 embeds priority information relating to the recognized object (face) into the video data (S220). The priority information can be acquired by referring to the facial registration information stored in the internal memory 240.

The controller 180 determines whether stop of the recording is instructed by the user (S630). When the determination is made that the stop of the recording is instructed, the controller 180 stops the generation of the video data and generates a management file (S640).

In this manner, every time the registered face is newly detected in the video data during the recording of the video data, the digital video camera 100 embeds the priority information about a person of the detected face.

Figure 16:
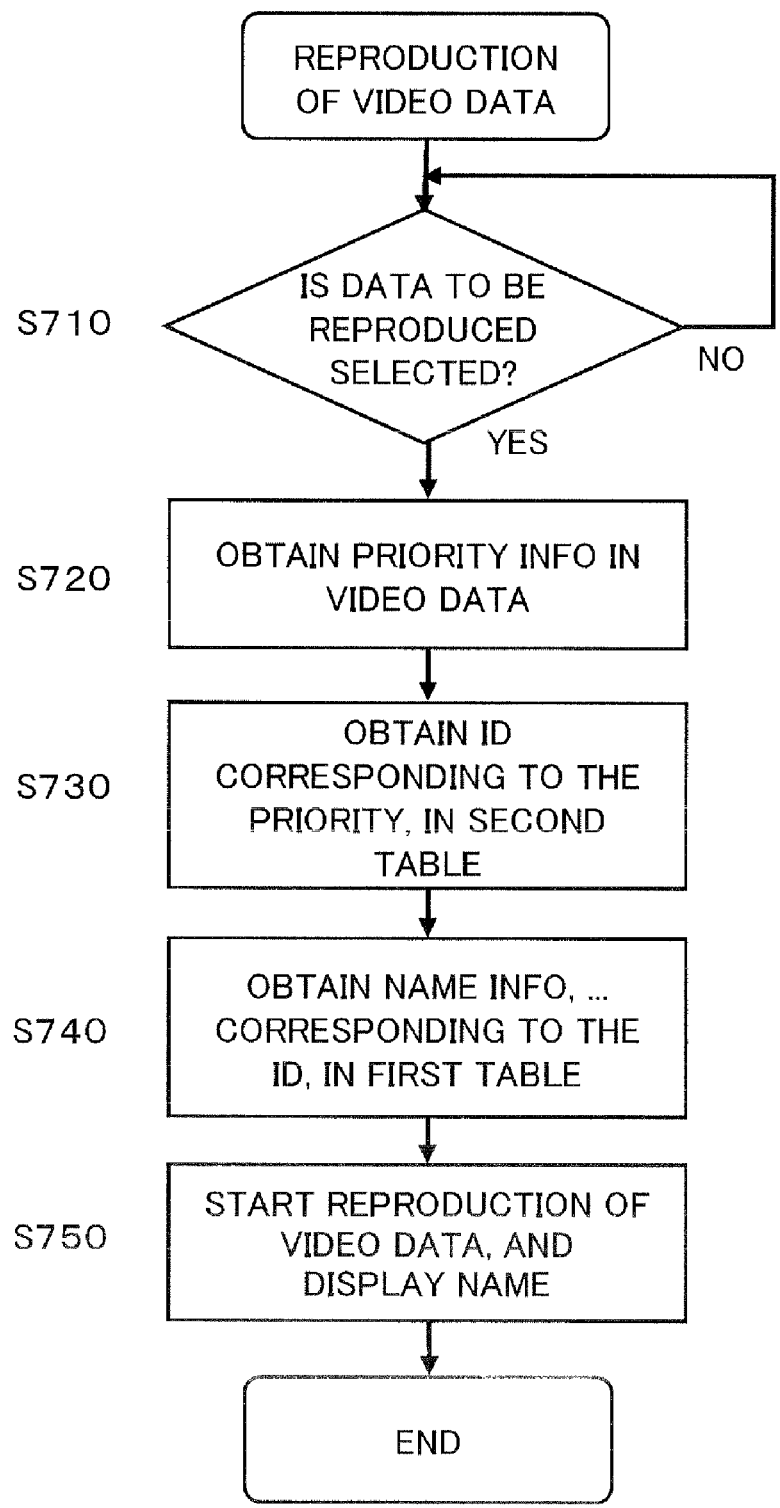
FIG. 16 is a flowchart describing an operation for reproducing the video data performed by the digital video camera (Second Embodiment).

A method for reproducing the video data recorded in the above manner is described with reference to a flowchart of FIG. 16.

When the digital video camera 100 is set into the playback mode, the controller 180 stands by until the user selects video data to be reproduced (S710).

When the video data to be reproduced is selected, the controller 180 acquires priority information embedded into the selected video data (S720). Thereafter, the controller 180 refers to the second table related to the selected video data, and acquires an ID related to the acquired priority information (S730).

The controller 180 refers to the first table in the management file, and acquires name information related to the acquired ID (S740). The controller 180 displays the acquired name information on the display monitor 220, and simultaneously starts the reproduction of the selected video data (S750).

Other Embodiment

In the above embodiments, the first table of the management file stores only the name information which is related to the ID. Instead of or in addition to the name information, another information such as date of birth may be stored in the first table.

Further, in the above embodiments, although the priority is embedded as the information for specifying the object to be recognized into the video data, information other than the priority may be used. That is, another information (for example, a second ID) that can identify the object to be recognized and has small data size can be used. In this case, another information and ID are related to each other in the second table.

In the above embodiments, although only one first table of the management file is provided for all video data recorded by the digital video camera 100, the first table may be provided for each of recording dates of video data.

The embodiment can be applied to imaging apparatuses such as digital still cameras and digital video cameras, and mobile telephones having a camera function that have the facial recognition function.

What is claimed is:

1. A imaging apparatus, comprising:
   a storage unit configured to store registration information in which information about a feature of an object, related to a subject, to be recognized, personal information relevant to an attribute of the subject, and non-personal information, which is different from the personal information, are related with each other and registered;
   a video generator configured to capture a subject image to generate video data;
   a detector configured to detect an object to be recognized which has a same feature as that registered in the registration information, in an image represented by the video data generated by the video generator;
   an embedding unit configured to embed the non-personal information relating to the object to be recognized which is detected by the detector into the video data to be generated; and
   a management file generator configured to generate a management file, the management file storing the non-personal information to be embedded into the video data and the personal information related, in the registration information, to the non-personal information to be embedded into the registration information.

2. The imaging apparatus according to claim 1, wherein the embedding unit embeds the non-personal information into the video data to be generated every predetermined time.

3. The imaging apparatus according to claim 1, wherein the management file includes:
   a first table for managing the personal information, and identification information which is related to the personal information; and
   a second table for managing the identification information, and the non-personal information which is related to the identification information.

4. The imaging apparatus according to claim 1, wherein the non-personal information is information representing priority used for determining a subject to be preferentially processed in a predetermined process.

5. The imaging apparatus according to claim 4, wherein the predetermined process is an autofocus process.

6. The imaging apparatus according to claim 1, wherein the object to be recognized is a face of a person.

* * * * *